(12) United States Patent
Lisi et al.

(10) Patent No.: US 9,231,412 B2
(45) Date of Patent: Jan. 5, 2016

(54) RESONANT SYSTEM FOR WIRELESS POWER TRANSMISSION TO MULTIPLE RECEIVERS

(75) Inventors: Gianpaolo Lisi, San Jose, CA (US); Gerard G. Socci, Palo Alto, CA (US); Ali Djabbari, Saratoga, CA (US); Ali Kiaei, San Jose, CA (US); Ahmad R. S. Bahai, Lafayette, CA (US); Jeffrey Anthony Morroni, Littleton, CO (US)

(73) Assignee: NATIONAL SEMICONDUCTOR CORPORATION, Santa Clara, CA (US)

( * ) Notice: Subject to any disclaimer, the term of this patent is extended or adjusted under 35 U.S.C. 154(b) by 779 days.

(21) Appl. No.: 13/330,891

(22) Filed: Dec. 20, 2011

(65) Prior Publication Data

US 2012/0169137 A1 Jul. 5, 2012

Related U.S. Application Data

(60) Provisional application No. 61/428,135, filed on Dec. 29, 2010, provisional application No. 61/428,109, filed on Dec. 29, 2010.

(51) Int. Cl.
*H02B 5/00* (2006.01)
*H02J 5/00* (2006.01)

(52) U.S. Cl.
CPC ......................................... *H02J 5/005* (2013.01)

(58) Field of Classification Search
CPC ......................................................... H04B 5/00
USPC ......................................................... 307/104
See application file for complete search history.

(56) References Cited

U.S. PATENT DOCUMENTS

| | | | |
|---|---|---|---|
| 7,741,734 B2 | 6/2010 | Joannopoulos et al. | |
| 2004/0130915 A1* | 7/2004 | Baarman | 363/21.02 |
| 2008/0014897 A1* | 1/2008 | Cook et al. | 455/343.1 |
| 2008/0157603 A1 | 7/2008 | Baarman et al. | |
| 2010/0026236 A1* | 2/2010 | Kamiyama et al. | 320/108 |

(Continued)

FOREIGN PATENT DOCUMENTS

JP          2006141115 A        6/2006

OTHER PUBLICATIONS

Hideaki Abe, et al., "A Noncontact Charger Using a Resonant Converter with Parallel Capacitor of the Secondary Coil" 2000 IEEE Xplore.

(Continued)

*Primary Examiner* — Adi Amrany
(74) *Attorney, Agent, or Firm* — Andrew Viger; Frank D. Cimino (57) ABSTRACT

In a wireless power transfer system with multiple receivers, receiver management may be necessary to effectively provide power to the multiple receivers. In one implementation, receiver management includes sweeping or stepping the transmitter resonant and/or operating frequency. In another implementation, receiver management includes receiver self-management, in which the receiver load current duty cycle is controlled to maintain receiver voltage even in the presence of multiple receivers. In another implementation, receiver management includes receiver self-management, in which one or more receivers use a time-sharing heuristic to identify when other receivers are charging and wait to begin receiving a transfer of power until another receiver has stopped receiving a transfer of power.

18 Claims, 6 Drawing Sheets

(56) References Cited

U.S. PATENT DOCUMENTS

| | | | |
|---|---|---|---|
| 2010/0052431 A1 | 3/2010 | Mita | |
| 2010/0118776 A1* | 5/2010 | Iwasa | 370/328 |
| 2010/0244581 A1 | 9/2010 | Uchida | |
| 2011/0074552 A1* | 3/2011 | Norair et al. | 340/10.1 |
| 2012/0106417 A1* | 5/2012 | Spero et al. | 370/311 |

OTHER PUBLICATIONS

Chwei-Sen Wang, et al., "Power Transfer Capability and Bifurcation Phenomena of Loosely Coupled Inductive Power Transfer Systems", 2004 IEEE Xplore.

R. Laouamer, et al., "A Multi-Resonant Converter for Non-Contact Charging with Electromagnetic Coupling," Jul. 22, 2010, IEEE Xplore.

Andre Kurs, et al., "Wireless Power Transfer via Strongly Coupled Magnetic Resonances," Science Express, Jun. 2007.

Yuequan Hu, et al.; "Universal-Input Single-Stage PFC Flyback with Variable Boost Inductance for High-Brightness LED Applications," IEEE (2010).

G. Vandevoorde, et al.; "Wireless energy transfer for stand-alone systems: a comparison between low and high power applicability," Published by Elsevier Science B.V. (2001).

Xiao Zhi Jian, et al.; "A Novel Wirless Charging System for Movable Telephone with Printed-circuit-board Windings of Different Structure and Shape Respectively," International Conference on Electrical Machines and Systems Oct. 8-11, 2007, Seoul, Korea.

Jun Pan, et al.; "A Self-Powered Sensor Module Using Vibration-Based Energy Generation for Ubiquitous Systems," IEEE (2005).

Geffrey K. Ottman,e t al.; "Adaptive Piezoelectric Energy Harvesting Circuit for Wireless Remote Power Supply," IEEE (2002).

C.-C., Tsai, B., et al.; "Design Wireless Transcutaneous Energy Transmission System for Totally Artificial Hearts," IEEE (2000).

David L. Mascarenas, et al.; "Experimental studies of using wireless energy transmission for powering embedded sensor nodes," Journal of Sound and Vibration, Published by Elsevier Ltd. (2009).

Jonsensor Zhao,; "A new calculation for designing multilayer planar spiral inductors," EDN (Jul. 29, 2010).

Takehiro Imura, et al, "Basic Experimental Study on Helical Antennas of Wireless Power Transfer for Electric Vehicles by using Magnetic Resonant Couplings," IEEE (2009).

Aristeidis Karalis, et al., "Efficient wireless non-radiative mid-range energy transfer," Elsevier, Science Direct, Annals of Physics, (2007).

\* cited by examiner

RESONANT SYSTEM FOR WIRELESS POWER TRANSMISSION TO MULTIPLE RECEIVERS

CROSS REFERENCE TO RELATED APPLICATIONS

The present application claims benefit to U.S. provisional application 61/428,109 entitled MULTIPLE RECEIVER LOAD MANAGEMENT IN A WIRELESS CHARGING SYSTEM and U.S. provisional application 61/428,135 entitled WIRELESS CHARGING OF MULTIPLE RECEIVERS OVER MULTIPLE FREQUENCIES, both filed Dec. 29, 2010, the contents of which are incorporated herein in their entirety.

BACKGROUND

Wireless power transfer may be achieved by coupling energy from an inductive component in a power delivery device (transmitter) to an inductive component in a power receiving device (receiver). Alternatively, capacitive components may be coupled.

A wireless power transfer system may include multiple receivers. In a resonant system, as more receivers are coupled to a transmitter for power transfer, the magnetic field intensity at the transmitter power transfer coil decreases. As the magnetic field intensity decreases, the power available for transfer decreases. Thus, the coupling of multiple receivers to a transmitter can cause the power available for transfer to decrease below a minimum level needed by a receiver. It is thus desirable to manage the power transfer to multiple receivers so that each receiver may receive adequate power.

DETAILED DESCRIPTION

For a wireless power transfer system using inductive power transfer components, also referred to as power transfer coils, the power is transferred through magnetic coupling between transmitter and receiver power transfer coils. In some implementations, a resonant circuit may be used in the transmitter to maximize power delivery, or a resonant circuit may be used in the receiver to maximize power reception. In some implementations, a dual-resonant system includes a resonant circuit in both the transmitter and the receiver. Power transfer in a dual-resonant system is most efficient when the transmitter and receiver are resonant at the same frequency. A resonant circuit may be achieved through impedance matching, described below.

Some resonant circuits have a high quality factor (Q-factor), resulting in the ability to deliver energy efficiently within a narrow bandwidth around the resonant frequency and substantially less energy at other frequencies.

When a receiver is magnetically coupled to a resonant transmitter operated at or near resonance, the effective Q-factor of the transmitter resonant circuit is decreased due to the receiver loading, and correspondingly the magnetic field intensity generated by the transmitter power transfer coil is reduced. Thus, the capability for the transmitter to transfer power is diminished. Resonant transmitter circuits are often designed to generate a high-intensity magnetic field. A high-intensity magnetic field may be generated by using high current through the power transfer coil. High-intensity magnetic field is also achieved by designing and maintaining the transmitter resonant circuit with a high Q-factor.

However, even if the uncoupled magnetic field intensity is very strong, the effect of multiple coupled receivers is to cause the magnetic field intensity to drop to levels not conducive to effective power transfer. Therefore, receiver management may be required to allow effective power transfer for multiple receivers.

Receiver management may be accomplished by design, for example by designing receivers with different resonant frequencies. In operation, the transmitter frequency is swept or stepped across different frequencies to strongly couple each of the multiple receivers at different frequencies to minimize the impact of multiple receivers. The frequency sweeping or stepping additionally serves to effectively couple a receiver in which the resonant frequency of the receiver drifts due to aging, stress, or the like.

Receiver management may be accomplished dynamically through self-management by the receivers. In one example, a receiver limits its current draw to limit the impact the receiver has on the magnetic field. In another example, a receiver identifies when other receivers are also coupled to the transmitter and correspondingly limits the time that it accepts power transfer from the transmitter, resulting in receiver time-sharing. The change in magnetic field as receivers start and stop accepting power transfer during time-sharing may be detected by the transmitter, and the knowledge used by the transmitter to stop generating a magnetic field or reduce the generated magnetic field when no receivers are present. The knowledge gained by the transmitter from monitoring the change in magnetic field may also be used to identify when metallic objects are in proximity to the transmitter and react accordingly.

Figure 1:
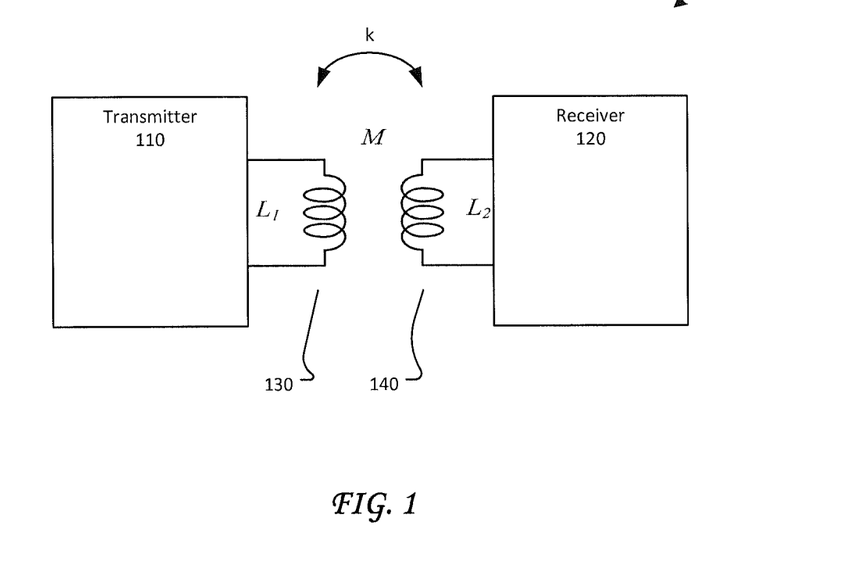
FIG. 1 illustrates an exemplary wireless power transfer system.

FIG. 1 illustrates an exemplary wireless power transfer system 100 with a transmitter 110 and a receiver 120. Transmitter 110 includes coil 130 having inductance L1. Receiver 120 includes coil 140 having inductance L2. Coils 130 and 140 are coupled with coupling coefficient k, which is a measure of magnetic coupling between the power transfer coils. The coupling coefficient is at least in part a function of the distance between the transmitter and the receiver and the relative orientation of the transmitter to the receiver. When the coupling coefficient between power transfer coils decreases, the power transferred between the coils correspondingly decreases. A mutual inductance M is established between coupled coils 130 and 140 at least in part as a function of coupling coefficient k and inductances L1 and L2.

A receiver may be a wirelessly-rechargeable device such as a mobile phone, computer, or GPS device. A receiver may alternatively be a wirelessly-powered device.

Figure 2:
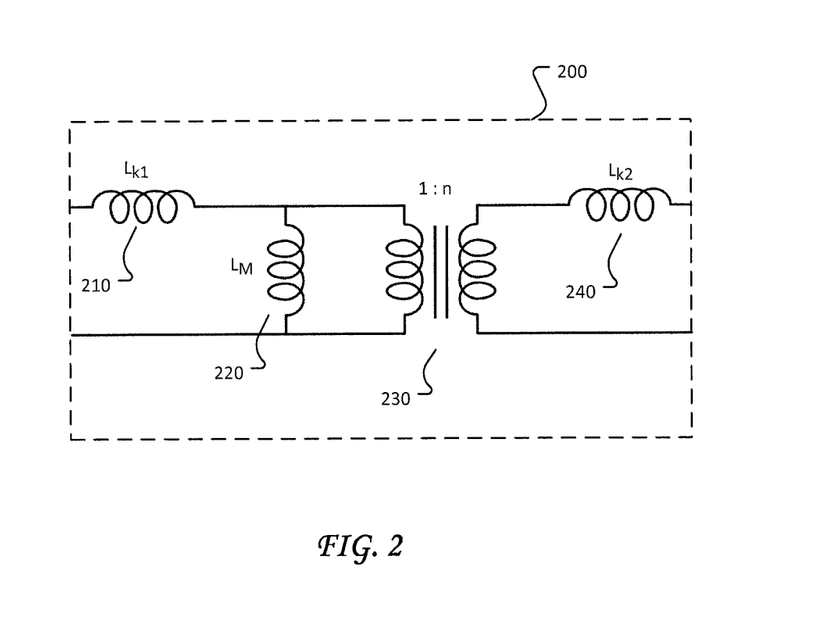
FIG. 2 illustrates an exemplary circuit model of coupled power transfer coils.

FIG. 2 illustrates a first equivalent electrical model 200 for the coils in the system 100 shown in FIG. 1. Inductors 210, 220, and 240 together with ideal transformer 230 model the effect of the coupling of coils 130 and 140 in FIG. 1. Inductors 210, 220, and 240 as modeled have the inductances shown in equations 1, 2, and 3, respectively.

$$L_{k1} = (1-k) \cdot L1 \quad (1)$$

$$L_M = k \cdot L1 \quad (2)$$

$$L_{k2} = (1-k) \cdot L2 \quad (3)$$

Ideal transformer 230 in the equivalent circuit of FIG. 2 is illustrated as having a 1:n turns ratio, where n is defined in equation 4.

$$n = \sqrt{\frac{L2}{L1}} \quad (4)$$

Coupling coefficient k is defined in equation 5.

$$k = \frac{M}{\sqrt{L1 \cdot L2}}$$

It is often desirable to increase energy transfer capability. For example, it may be desirable to increase the power transfer level for faster charging of a wirelessly-charged device. For another example, it may be desirable to compensate for a low value of coupling coefficient k. Power transfer may be increased by increasing the voltage at the transmitter coil. One way of increasing the voltage at the transmitter coil is to increase the voltage of the transmitter power supply output. Another way of increasing the voltage at the transmitter coil is to operate the transmitter at a resonance frequency. Additionally, a higher-Q resonant circuit will provide a higher voltage at the coil.

Increased power transfer and power transfer efficiency may be achieved when the electrical load seen by the transmitter power supply appears purely resistive. The reactive components of the system must be impedance-matched to provide a resistive load. In FIG. 2, the reactive components in the effective circuit model 200 are ideal transformer 230 and inductors 210, 220, and 240. Thus, to provide effectively a purely resistive load for the model of FIG. 2, impedance matching circuit components must be added to match the transformer and coils.

Figure 3:
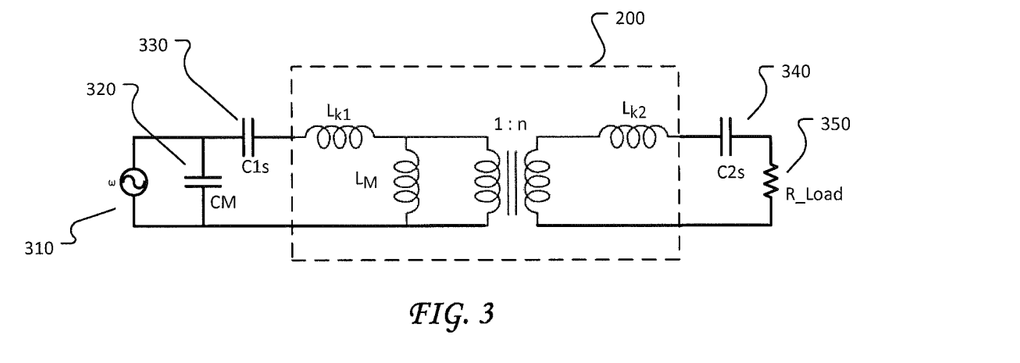
FIG. 3 illustrates an exemplary circuit for impedance matching of coupled power transfer coils.

FIG. 3 illustrates an exemplary impedance matching circuit for the circuit model 200 of FIG. 2. On the transmitter side, power supply 310 has a frequency f represented by $\omega=2\pi f$. Also on the transmitter side, capacitor C1a has a capacitance as given in equation 6, and capacitor CM has a capacitance as given in equation 7. On the receiver side, capacitor C2a has a capacitance as given in equation 8.

$$C1a = \frac{1}{\omega^2 \cdot L_{k1}} = \frac{1}{\omega^2 \cdot L_1 \cdot (1-k)} \quad (6)$$

$$CM = \frac{1}{\omega^2 \cdot L_M} = \frac{1}{\omega^2 \cdot L_1 \cdot k} \quad (7)$$

$$C2a = \frac{1}{\omega^2 \cdot L_{k2}} = \frac{1}{\omega^2 \cdot L_2 \cdot (1-k)} \quad (8)$$

For the frequency $\omega=2\pi f$, the capacitance of capacitor C1a is equal in magnitude to the inductance of model 200 inductor Lk1, the capacitance of capacitor CM is equal in magnitude to the inductance of inductor LM, and the capacitance of capacitor C2a is equal in magnitude to the inductance of inductor Lk2. Thus, at the frequency $\omega=2\pi f$, the imaginary part of the reactance of each capacitor cancels out the imaginary part of the reactance of its corresponding inductor, and the circuit of FIG. 3 is impedance matched for the frequency $\omega=2\pi f$. In the ideal case the system appears to the power supply as a purely resistive load, allowing for improved power transfer. Impedance matching may be done at the design stage for a known operating frequency, or during operation for changing system conditions. For example, at least one of capacitors CM, C1a, and C2a may be implemented as variable capacitors to allow for tuning of the impedance matching during operation for changing system conditions. Variable capacitors, or other variable components, also allow for adjusting the resonant frequency of an associated resonant circuit.

Capacitor CM is illustrated in FIG. 3 on the transmitter side. However, capacitor CM could alternatively be located on the receiver side.

Model 200 as illustrated in FIG. 2 provides one equivalent electrical model for the interaction between the transmitter and receiver coils in a wireless power transfer system. Other models may be used instead.

Figure 4:
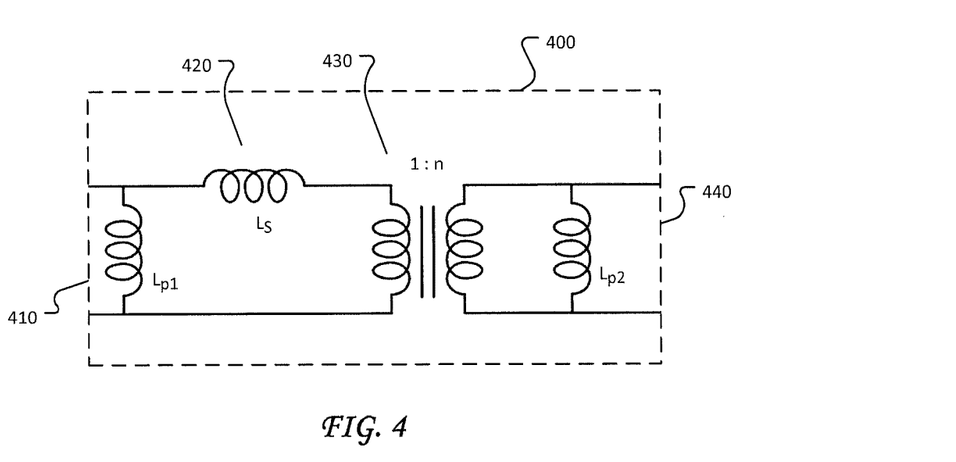
FIG. 4 illustrates another exemplary circuit model of coupled power transfer coils.

FIG. 4 illustrates a second equivalent electrical model 400 for the coils in the system 100 shown in FIG. 1. Inductors 410, 420, and 440 together with ideal transformer 430 model the effect of the coupling of coils 130 and 140 in FIG. 1. Inductors 410, 420, and 440 as modeled have the inductances shown in equations 9, 10, and 11, respectively. The number of turns n of the ideal transformer 430 is as defined in equation 4 above. The coupling coefficient k between coupled coils 130 and 140 is as defined in equation 5 above.

$$L_{p1} = (1+k) \cdot L1 \quad (9)$$

$$L_S = L1 \cdot \frac{(1-k^2)}{k} \quad (10)$$

$$L_{p2} = (1+k) \cdot L2 \quad (11)$$

Figure 5:
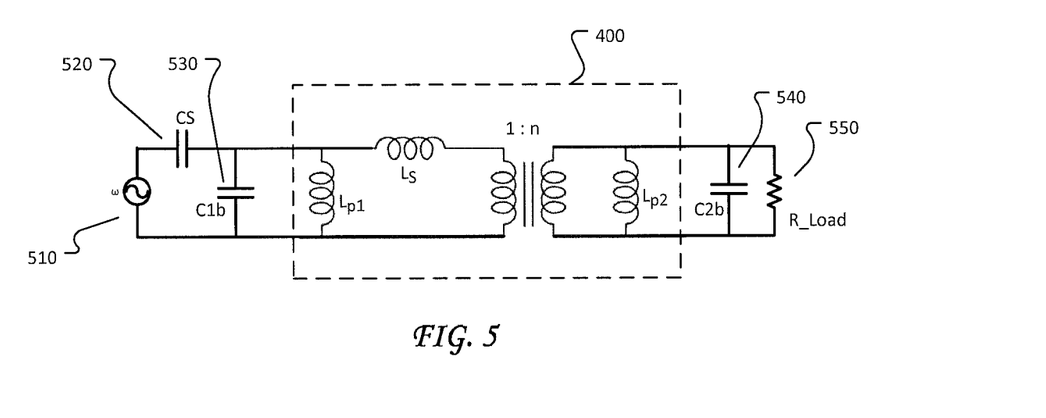
FIG. 5 illustrates another exemplary circuit for impedance matching of coupled power transfer coils.

FIG. 5 illustrates an exemplary impedance matching circuit for the circuit model 400 of FIG. 4. On the transmitter side, power supply 510 has a frequency f represented by $\omega=2\pi f$. Also on the transmitter side, capacitor C1b has a capacitance as given in equation 12, and capacitor CS has a capacitance as given in equation 13. On the receiver side, capacitor C2b has a capacitance as given in equation 14.

$$C1b = \frac{1}{\omega^2 \cdot L_{p1}} = \frac{1}{\omega^2 \cdot L_1 \cdot (1+k)} \quad (12)$$

$$CS = \frac{1}{\omega^2 \cdot L_S} = \frac{1}{\omega^2 \cdot L_1 \cdot (1-k^2)} \quad (13)$$

$$C2b = \frac{1}{\omega^2 \cdot L_{p2}} = \frac{1}{\omega^2 \cdot L_2 \cdot (1+k)} \quad (14)$$

At the frequency $\omega=2\pi f$, the capacitance of capacitor C1b is equal in magnitude to the inductance of model 400 inductor $L_{p1}$, the capacitance of capacitor CS is equal in magnitude to the inductance of inductor $L_S$, and the capacitance of capacitor C2b is equal in magnitude to the inductance of inductor $L_{p2}$. Thus, at the frequency $\omega=2\pi f$, the imaginary part of the reactance of each capacitor cancels out the imaginary part of the reactance of its corresponding inductor, and the circuit of FIG. 5 is impedance matched for the frequency $\omega=2\pi f$. In the ideal case the system appears to the power supply as a purely resistive load, allowing for improved power transfer. Impedance matching may be done at the design stage for a known operating frequency, or during operation for changing system conditions. For example, at least one of capacitors CS, C1b, and C2b may be implemented as variable capacitors to allow for tuning of the impedance matching during operation for changing system conditions. Variable capacitors, or other variable components, also allow for adjusting the resonant frequency of an associated resonant circuit.

Capacitor CS is illustrated in FIG. 5 on the transmitter side. However, capacitor CS could alternatively be located on the receiver side. Other circuit topologies for impedance matching are also possible.

Figure 6:
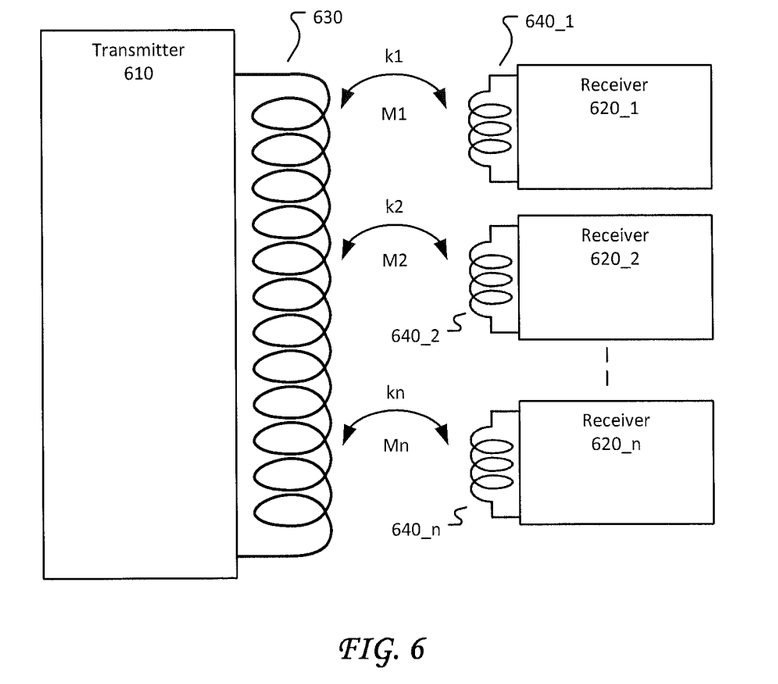
FIG. 6 illustrates an exemplary wireless power transfer system with multiple receivers.

FIG. 6 illustrates an exemplary wireless power transfer system with one transmitter 610 and a number 'n' of receivers 620, shown as receivers 620_1 through 620_n. Transmitter 610 includes power transfer coil 630. Each receiver 620 includes a power transfer coil 640, shown as coils 640_1, 640_2, and 640_n corresponding to receivers 620_1, 620_2, and 620_n, respectively. The receiver coils 640 are coupled to transmitter coil 630 with a corresponding coupling coefficient and mutual inductance. For example, receiver coil 640_1 is coupled to transmitter coil 630 with coupling coefficient k1 and mutual inductance M1.

Power transfer efficiency is improved when the resonant frequencies of the transmitter and receiver are the same. A system such as the system in FIG. 6 may be designed such that transmitter 610 and receivers 620 all have the same resonant frequency. However, the system may be designed such that transmitter 610 and receivers 620 have different resonant frequencies. Moreover, receivers 620 may be designed independently from the overall system design and thus have resonant frequencies different than transmitter 610. Thus, transmitter 610 may be designed to be receiver agnostic and to provide power across a specified frequency band, such that any receiver 620 in which the resonant frequency is within the specified frequency band may be charged or powered by transmitter 610. In such a system, a non-resonant receiver may also receive power transfer.

Transmitter 610 may determine the resonant frequencies of the multiple receivers 620. The transmitter 610 frequency may then be stepped through a sequence of receiver 620 resonant frequencies to transfer power to the multiple receivers 620 in turn. Alternatively, the transmitter 610 frequency may be swept across a band of frequencies. A step sequence or sweep sequence may include steadily increasing or decreasing frequencies. For example, if the number of receivers and their resonant frequencies is unknown, the transmitter may start at one frequency and step or sweep to another frequency according to the specifications of the transmitter. However, a step sequence or sweep sequence does not need to steadily increase or decrease, but may instead increase and decrease according to a sequence stored in a memory or according to an algorithm, and may be interrupted periodically or occasionally. For example, if one receiver requires power transfer for operation, the transmitter may jump to that receiver's resonant frequency periodically to provide a steady power source to the receiver.

Stepping and sweeping may be repeated several times to transfer power to the receivers in a parallel fashion, or may be performed only once such that full power transfer is performed for each receiver or subset of receivers in turn. For example, when the receivers are used for recharging batteries, a stepping may be repeated continually with a step eliminated when power transfer is not occurring at that step, until all receivers are fully recharged.

Transmitter frequency may be adjusted, as described above, by adjusting the resonant frequency of the transmitter resonant circuit, by adjusting the operating frequency of the resonant circuit, or by adjusting both the resonant frequency and the operating frequency of the transmitter. In some implementations, the transmitter resonant frequency and operating frequency are adjusted to be substantially the same.

Figure 7:
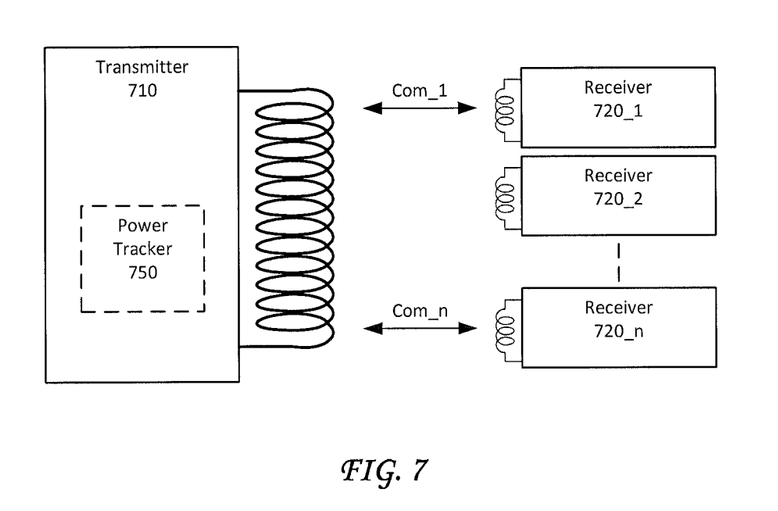
FIG. 7 illustrates an exemplary wireless power transfer system with multiple receivers, and including communications links and a power tracker.

FIG. 7 illustrates an exemplary wireless power transfer system similar to the system of FIG. 6, with one transmitter 710 and a number 'n' of receivers 720, shown as receivers 720_1 through 720_n. The system of FIG. 7 further includes a communication link Com_1 between receiver 720_1 and transmitter 710, a communication link Com_n between receiver 720_n and transmitter 710, and an optional power tracker 750. As shown in FIG. 7, receiver 720_2 does not have a communication link to transmitter 710, illustrating that communication links are optional.

Communication links may be wired or wireless links, and may use standard or proprietary protocols for exchanging information. Although illustrated as bidirectional, a communication link may be unidirectional. A communication link may be used, for example, to identify the type of receiver and its resonant frequency.

The resonant frequency of each receiver 720 may be determined without a communication link by varying the resonant frequency or power supply frequency of transmitter 710 to find frequencies providing power transfer maxima. A power transfer maximum may be observed or calculated, for example, from voltage and current measurements within transmitter 710.

Power tracker 750 is a circuit for determining the resonant frequencies of coupled receivers 720, and may include electrical components, firmware, software, or a combination of electrical components, firmware and software. Power tracker 750 may determine the number of receivers 720 and the resonant frequencies of the receivers 720 by measurements on transmitter 710 or via one or more communication links, and may also consider other information from the receivers 720 as available. Other information from the receivers may include, for example, information such as device type, average power transfer required for receiver operation, maximum charging power required, maximum coil voltage, and device charging priority. Power tracker 750 may use information about the receivers 720 to set a step or sweep sequence. Power tracker 750 may gather updated information about receivers 720 in the area occasionally, periodically, by a notification from a receiver 720, or by some other trigger mechanism. Power tracker 750 may use the updated information about the receivers 720 to modify the step or sweep sequence or to create a new step or sweep sequence.

Figure 8:
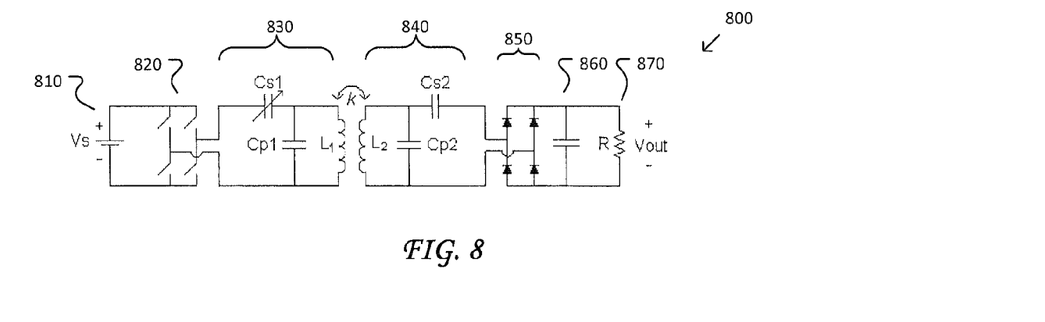
FIG. 8 illustrates an exemplary wireless power transfer system.
Figure 9:
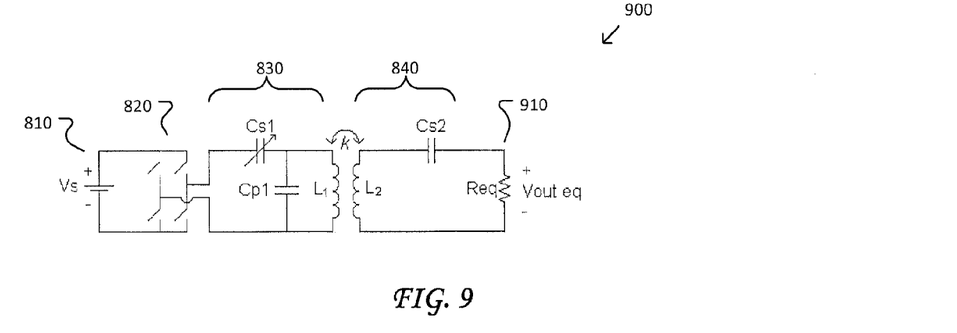
FIG. 9 illustrates an exemplary equivalent circuit representation of an exemplary wireless power transfer system.
Figure 10:
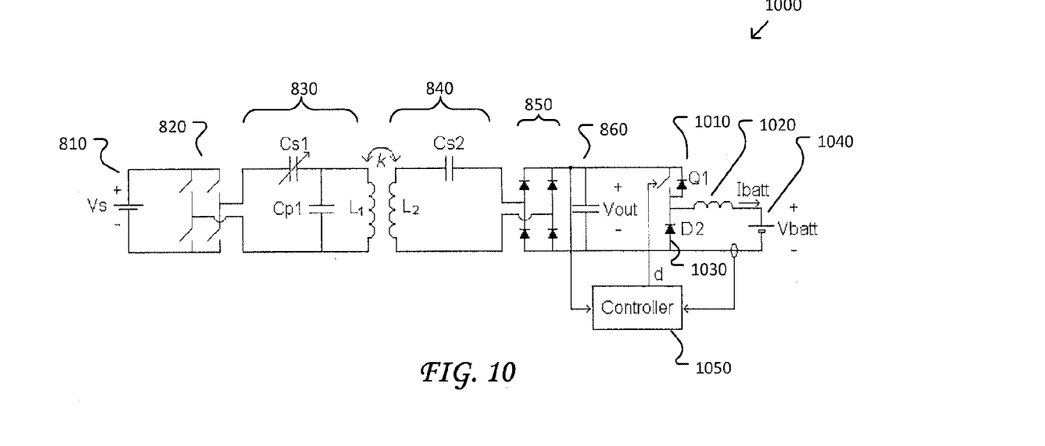
FIG. 10 illustrates an exemplary control of load current in a wireless power transfer receiver.

Alternatively or additionally to receiver management through stepping/sweeping of the transmitter frequency as described above, a receiver may perform self-management to limit its impact on the magnetic field generated by the transmitter. For example, a receiver may limit the average power received to a minimum necessary for operation or charging, as the case may be. FIG. 10 illustrates such a receiver. FIGS. 8 and 9 with corresponding description provide a basis for understanding the implementation of FIG. 10.

FIG. 8 illustrates an exemplary wireless power transfer system 800, which is one implementation of wireless power transfer system 100 in which transmitter 110 is represented by the components 810-830, and receiver 120 is represented by components 840-870.

Transmitter component 810 is a direct current (DC) power source with voltage Vs. Source 810 may be a battery, such as one or more batteries in the transmitter, or a vehicle battery connected to the transmitter. Source 810 may alternatively be part of a power supply that converts line voltage such as 110V AC (alternating current) to low voltage DC, for example 5V DC.

Transmitter component 820 is a set of switches that are switched to convert the DC voltage to AC voltage for powering the transmitter resonant circuit. Component 820 in one example is an H-bridge.

Transmitter components 810 and 820 together form at least part of an AC power source for the transmitter resonant circuit. Other AC source topologies are also possible.

Transmitter component 830 is the transmitter resonant circuit, including a power transfer coil with inductance L1, a parallel capacitor with capacitance Cp1, and a series capacitor with capacitance Cs1. The series capacitance Cs1 may be, but is not necessarily, variable as indicated. Component 830 illustrates an exemplary resonant circuit topology. Other transmitter resonant circuit topologies are also possible.

Receiver component 840 is the receiver resonant circuit, including a power transfer coil with inductance L1, a parallel capacitor with capacitance Cp2, and a series capacitor with capacitance Cs2. The series capacitance Cs2 may be variable. Other receiver resonant circuit topologies are also possible. The receiver power transfer coil is connected to the resonant circuit to convert the oscillating magnetic field generated by the transmitter power transfer coil into a high voltage oscillating (AC) signal.

Receiver component 850 is a rectifier that is capable of converting the AC voltage from the resonant circuit into DC voltage.

Receiver component 860 is a capacitor used to reduce the voltage ripple generated by the rectifier in the rectification process. The voltage across capacitor 860 is the output voltage Vout provided to the receiver load.

Receiver component 870 represents a DC receiver load. For example, load 870 may be the electronic circuitry of the receiver powered by output voltage Vout, or may be a battery charging circuit. Load 870 may be both receiver electronic circuitry and a battery charging circuit. Note that although load 870 is represented by a resistor with resistance R, this is just a simplified representation of what can be a more complicated DC load including power conditioning circuits, batteries, and other types of components capable of absorbing or dissipating power.

Receiver components 850, 860, and 870 together represent just one topology. Other topologies are possible. For example, the AC voltage from component 840 may be level-shifted and applied directly to the load.

The value of load 870 is determined by the voltage Vout and by the current absorbed by the DC load and can therefore vary depending on the operating point of the load. For example, if load 870 is a battery and a battery charging circuit, the value of load 870 will depend on the state of charge of the battery and the operating point of the battery charging circuit.

Under the assumption that the higher order harmonics of the AC voltage seen at the input of the rectifier are suppressed by the narrow-band filter formed by the receiver's resonant network and therefore only the fundamental sinusoidal component is take into account, it can be shown that the components 850, 860, and 870 together (i.e., rectifier, capacitor, and load) can be approximated by an equivalent resistor Req. The value of Req is calculated in Equation 15.

$$R_{eq} = R \cdot \frac{8}{\pi^2} \quad (15)$$

FIG. 9 illustrates a system 900 in which the components 850, 860, and 870 of system 800 have been represented by equivalent load 910 with value Req for purposes of explanation and calculation. The output voltage developed across equivalent load 910 is Vout_eq, described by Equation 16, where 'w' is the operating frequency of the circuit expressed in radians per second (rad/s) and 't' is time.

$$V_{out\_eq} = \frac{4}{\pi} \cdot Vout \cdot (\sin(\omega t)) \quad (16)$$

Vout_eq can be solved for given conditions. It can be shown that Vout_eq is a strong function of the voltage Vs and the coupling coefficient k, among other parameters. As the magnetic field intensity and/or the coupling between the coils decreases, the voltage Vout_eq correspondingly decreases. If Vout_eq drops below the minimum voltage required by load 910, power transfer ceases.

The voltage Vout_eq is also a function of the load 910 value Req. In most practical applications, as Req decreases, the equivalent impedance reflected at the component 830 power transfer coil decreases, causing a drop in the Q-factor of the transmitter resonant network and ultimately a drop in the magnetic field generated by the transmitter. Vout_eq decreases corresponding to a decrease in the magnetic field.

When the transmitter and receiver are strongly coupled, for example when the receiver and the transmitter are physically close and aligned to each other, power transfer is limited by the power sinking capability of the load. For strong coupling, the load 910 value Req is therefore determined by the maximum power that the load is capable of absorbing.

When the transmitter and receiver are weakly coupled, for example when the receiver is physically far from the transmitter, power transfer may be limited by the transmission capability of the coupled power transfer coil.

Maximum power as limited by the load is referred to herein as Pload_max. Maximum power as limited by the coupling of the coils is referred to herein as Pcoup_max. If Pcoup_max<Pload_max, the load 910 value Req will gradually decrease until the output voltage Vout_eq drops below the minimum voltage Vout_min necessary for the receiver circuitry to function properly, at which point power transfer will cease.

To allow for effective power transfer even in the condition Pcoup_max<Pload_max, a controller may be included in the receiver for receiver power self-management.

FIG. 10 illustrates an exemplary wireless charging system 1000 including a battery charger circuit, presented as illustrative of how a receiver may include a self-management controller. Other topologies are also possible. Components 810, 820, 830, 840, 850, and 860 of system 1000 are at least similar to the similarly-numbered components described above with respect to FIG. 8. Component 1010 is a switch Q1 with free-wheeling diode. Component 1020 is a body diode. Together, components 1010 and 1020 represent a buck converter. Component 1030 is an inductor.

Component 1040 is a rechargeable DC battery with battery voltage Vbatt and, when applicable, charging current Ibatt.

Component 1050 is a self-management power controller. Controller 1050 monitors the voltage Vout across capacitor 860 and the charging current Ibatt through battery 1040. Based on the monitoring, controller 1050 controls switch 1010, changing the duty cycle of switch 1010 to control Ibatt. The voltage Vbatt is essentially constant; therefore, change in charging current Ibatt means change in the power absorbed by the receiver.

For the buck converter implementation of FIG. 10, battery 1040 will only be charged if the voltage Vout is greater than a minimum voltage Vout_min, which is a function of the design and conditions of the receiver. A boost converter implementation would allow for charging at lower values of Vout.

Controller 1050 in the receiver of FIG. 10 begins switching switch 1010 when Vout>Vout_min. The controller increases the duty cycle of switch 1010 until one of the following conditions occurs: (a) charging current Ibatt reaches a maximum current Ibatt_max that the battery can accept; (b) charging current Ibatt reaches a peak such that further duty cycle increase causes a decrease in charging current Ibatt; or (c) Vout falls to Vout_min. For condition (a), the controller will stop increasing the duty cycle. For conditions (b) and (c), the controller will decrease the duty cycle by a predefined amount.

Figure 11:
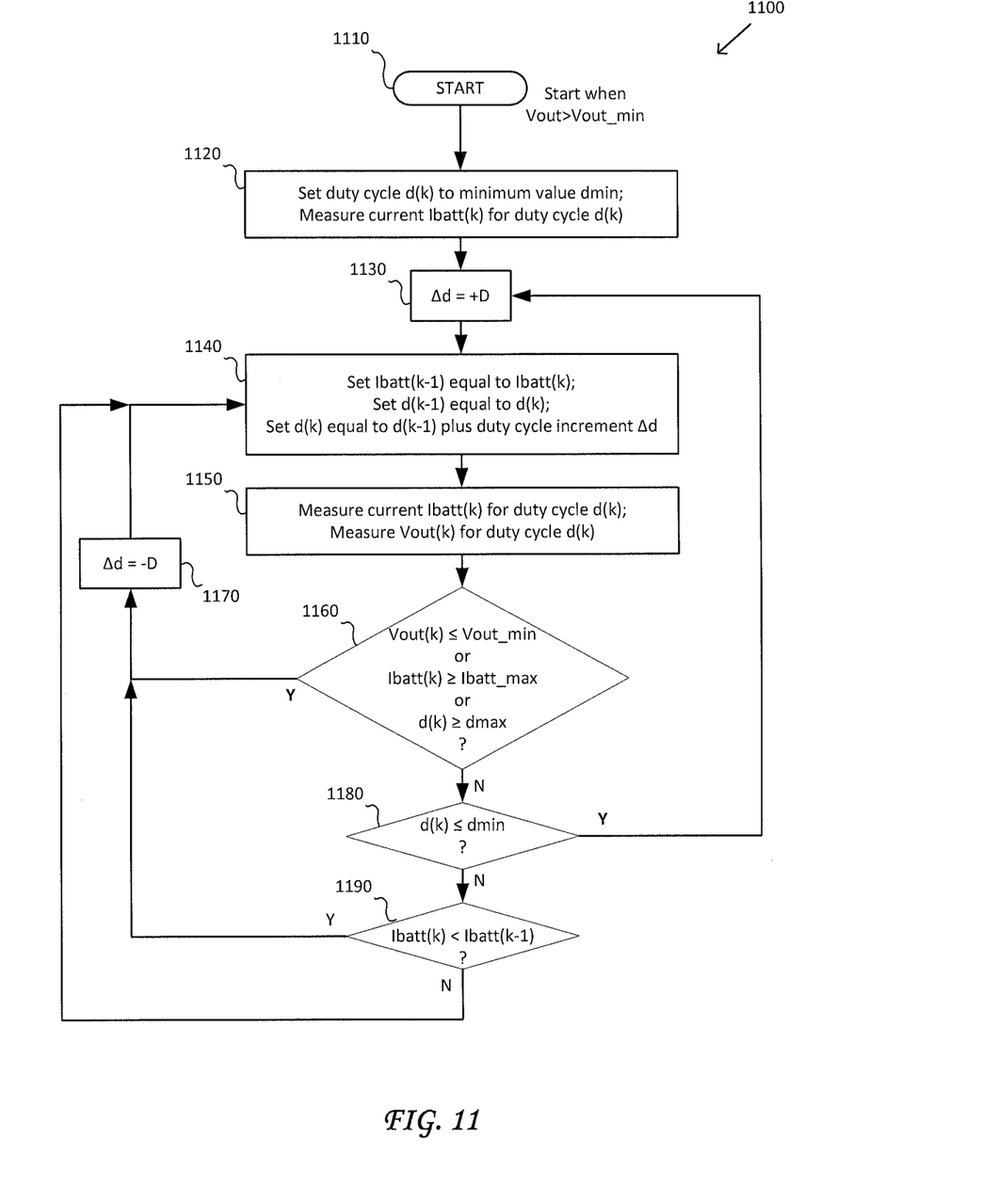
FIG. 11 illustrates an exemplary flow diagram for receiver self-management.

FIG. 11 illustrates the described function of a controller such as controller 1050 by way of flow diagram 1100. Although flow diagram 1100 is described in terms of components of FIG. 10, flow diagram 1100 is not limited in application to the topology illustrated in the example of FIG. 10.

Flow diagram 1100 starts at block 1110 when the value of Vout exceeds the value Vout_min. This may occur as the value of Vout is rising, for example at startup of the transmitter or receiver, or when the receiver first comes in proximity to the transmitter. Alternatively, flow diagram 1100 may start upon a trigger at some time after the receiver and transmitter have reached a steady operating condition. For example, for a receiver that receives a transfer of power for battery charging, flow diagram 1100 may not be triggered until the battery charge drops below a threshold.

At block 1120, the duty cycle d(k) of switch 1010 is set to a minimum value dmin and current Ibatt(k) is measured at the present value of switch duty cycle d(k).

At block 1130, a duty cycle increment Δd is set equal to a predefined value 'D' with positive sign.

At block 1140, the present conditions are saved as previous conditions, and new present conditions are calculated. In particular, present current Ibatt(k) is saved as previous current Ibatt(k−1); present switch duty cycle d(k) is saved as previous switch duty cycle d(k−1); and present switch duty cycle d(k) is calculated as the immediately previous switch duty cycle d(k−1) plus increment Δd.

At block 1150, present current Ibatt(k) and voltage Vout(k) are measured at the present value of switch duty cycle d(k).

At decision block 1160, present voltage Vout(k) is compared to the minimum operating voltage threshold Vout_min, Ibatt(k) is compared to maximum load current threshold Ibatt_max, and duty cycle d(k) is compared to maximum duty cycle threshold dmax. If Vout(k) is less than or equal to Vout_min or Ibatt(k) is greater than or equal to Ibatt_max, indicating that the receiver load has been increased too much, or if d(k) is greater than or equal to dmax, flow diagram 1100 continues at block 1170 to set duty cycle increment Δd equal to value 'D' with negative sign, and then continues to block 1140 to save the present conditions and decrease the duty cycle (by adding Δd=−D).

If at decision block 1160, Vout(k), Ibatt(k) and d(k) do not cross their respective thresholds, flow diagram 1100 continues at block 1180.

At block 1180, d(k) is compared to minimum duty cycle threshold dmin. If d(k) is less than or equal to dmin, flow diagram continues at block 1130 to set duty cycle increment Δd equal to value 'D' with positive sign, and then to block 1140 to save the present conditions and increase the duty cycle (by adding Δd=+D). If d(k) is greater than dmin at decision block 1180, flow diagram 1100 continues at decision block 1190.

At decision block 1190, if present current Ibatt(k) is less than immediately previous current Ibatt(k−1), then flow diagram 1100 continues at block 1170 to set duty cycle increment Δd equal to value 'D' with negative sign, and then to block 1140 to save the present conditions and decrease the duty cycle (by adding Δd=−D). Otherwise, flow diagram 1100 continues at block 1140 to save the present conditions and increase or decrease the duty cycle, depending on the present sign of 'D'.

Duty cycle is physically limited to 0%-100%, and may also be limited in the heuristic to these values, such that dmin=0% and dmax=100%. The duty cycle may also be limited with a maximum less than 100% and/or a minimum greater than 0%.

Thus has been described a self-managed receiver in which the duty cycle of a switch is varied to increase or decrease the current flowing through a load, thereby allowing for control over the voltage Vout across the load. Control of the switch duty cycle includes control for keeping Vout above the minimum operating voltage, finding a peak operating load current, and keeping load current Ibatt below a maximum operating current. Control of the switch duty cycle therefore allows for adaptive receiver load, such that a receiver may adapt its power draw for changing system conditions, including changing conditions caused by the presence, the addition, or the subtraction of other receivers proximate the transmitter.

Another type of self-management of a receiver, which may be additional or alternative to the self-management described above with respect to the example provided in flow diagram 1100, is adaptive time sharing by a receiver. A receiver with adaptive time sharing recognizes other receivers proximate the transmitter when there is an increase or decrease in receiver voltage as another receiver stops or starts receiving transferred power, respectively. When a first receiver recognizes that at least one other receiver is receiving a transfer of power, the first receiver initiates an adaptive time share heuristic. For example, in the representative system of FIG. 8, if the receiver recognizes that the output voltage Vout of the rectifier quickly decreases or increases, the receiver may determine that another receiver has started or ended a power transfer session, and may adapt its time sharing accordingly. Many different heuristics may be implemented to provide receiver self-management through time sharing. One implementation is described with respect to FIG. 12.

Figure 12:
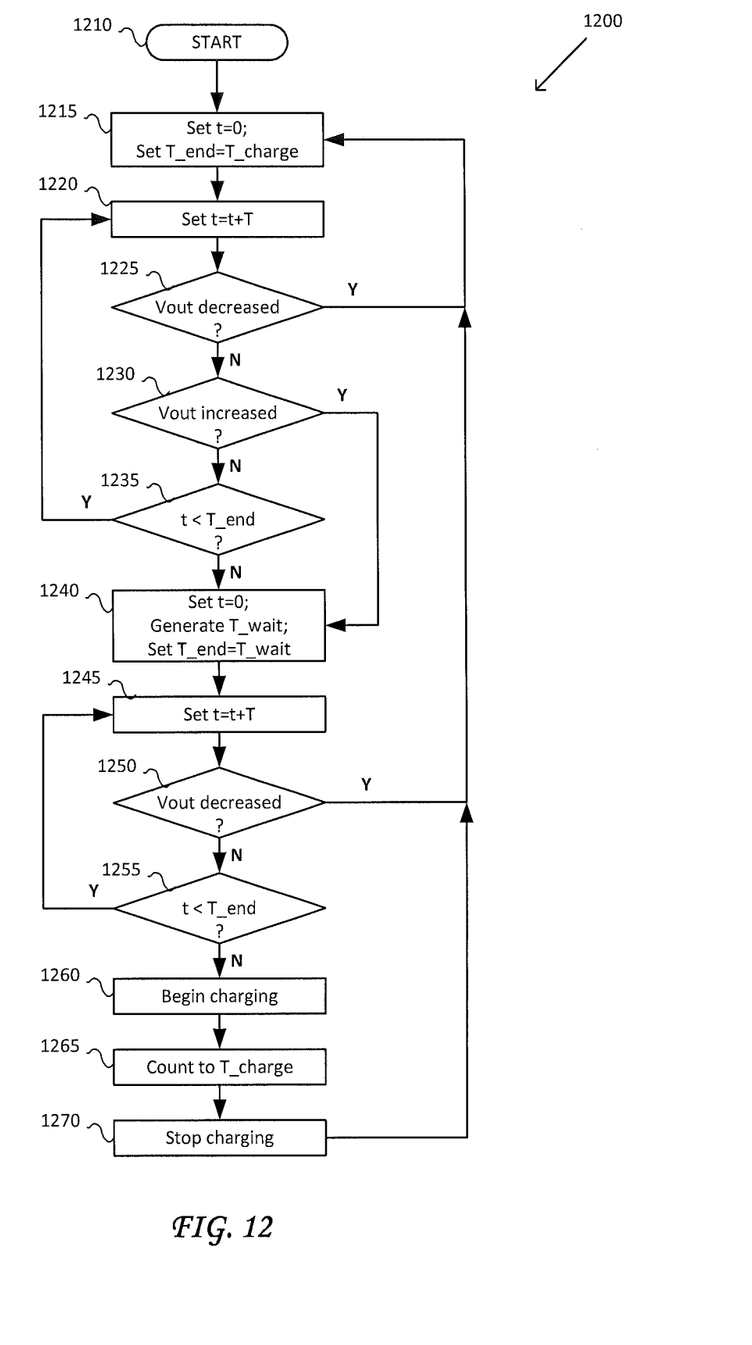
FIG. 12 illustrates another exemplary flow diagram for receiver self-management.

FIG. 12 is a flow diagram 1200 illustrating an exemplary implementation of an adaptive time share heuristic. Flow diagram 1200 starts at block 1210.

At block 1215, a count t is initialized to zero (i.e., t=0). The count t represents the passage of time. Also in block 1215, a duration variable T_end is set to the value T_charge. In a receiver in which a battery is being charged, T_charge is the time pre-allotted or dynamically allotted to the receiver for uninterrupted charging in one cycle. Multiple cycles may be necessary to fully charge the battery. In a receiver in which the power received is used for operating power, T_charge is the time pre-allotted or dynamically allotted to the receiver for uninterrupted power transfer in one cycle. In such a receiver, the receiver includes a temporary storage mechanism such as a capacitor to store power for powering the receiver when the receiver is not in the power-receiving portion of the cycle.

At block 1220, count t is increased by increment T, where the increment may be related to time directly or indirectly. For example, a direct relation to time may be established by triggering an increment to count t at the expiration of a timer, or incrementing count t in a software loop of known frequency and duration. For another example, an indirect relation to time may occur when an increment to count t occurs at the same place in a software loop, but the software loop is unpredictable in terms of frequency or duration.

At decision block 1225, if Vout has decreased, indicating that another receiver has started receiving a transfer of power, flow diagram 1200 continues at block 1215, where the count t is reset and T_end is set equal to T_charge again. If Vout has not decreased, flow diagram 1200 continues at decision block 1230.

At decision block 1230, if Vout has increased, indicating that another receiver has stopped receiving a transfer of power, flow diagram 1200 skips block 1235 and continues at block 1240, described below. If Vout has not increased, flow diagram 1200 continues at decision block 1235.

At decision block 1235, if count t is less than the value of T_end, indicating that the time charging period T_charge has not yet expired since another receiver started receiving a transfer of power, flow diagram 1200 continues at block 1220 to increment count t. If, however, count t is greater than or equal to the value of T_end, indicating that the other receiver should be finished or nearly finished with its period of charging, flow diagram 1200 continues at block 1240.

At block 1240, count t is reset to zero, a random value T_wait is generated, and T_end is set to T_wait, the period that the receiver is to wait before beginning to receive power. The value for T_wait is random to limit inference between the receivers. If all receivers had the same value for T_wait, then all of the receivers would attempt to start receiving a transfer of power at the same time, possibly resulting in a drop in the magnetic field intensity at the transmitter power transfer coil to a point where none of the receivers are able to receive power.

At block 1245, count t is incremented by value T.

At decision block 1250, if Vout has decreased, indicating that another receiver has begun a period of receiving power transfer, flow diagram 1200 continues at block 1215. Otherwise, flow diagram 1200 continues at decision block 1255.

At decision block 1255, if count t is less than the value of T_end, indicating that the wait period has not ended, flow diagram 1200 continues at block 1245 to increment count t. Otherwise, flow diagram 1200 continues at block 1260.

At block 1260, the receiver begins accepting a transfer of power.

At block 1265, while the receiver is accepting a transfer of power, count t is incremented periodically or occasionally until count t is equal to allotted time T_charge.

At block 1270, the receiver stops accepting a transfer of power, and flow diagram 1200 continues at block 1215 such that the receiver is again effectively in the queue to receive a transfer of power.

Flow diagram 1200 may be stopped at any time, for example if the receiver no longer requires a transfer of power, or if the receiver is removed from the proximity of the transmitter. Flow diagram 1200 may include additional blocks, for example, flow diagram 1200 may be modified such that if the receiver has waited a time equal to a threshold time, the receiver will begin charging regardless of the state of other recognized receivers. For another example, flow diagram 1200 may be modified such that at start of the heuristic, the receiver begins charging after a set period in which no other receiver is recognized as starting or stopping a cycle of receiving power transfer. Other modifications to flow diagram 1200 may be made.

T_charge was described for the example of FIG. 12 as a constant. Another heuristic may be adapted for variable values of T_charge. For example, T_charge may vary depending on the state of charge of a receiver battery to be charged, or may vary depending on the present loading conditions of the receiver receiving operating power from the transmitter. T_charge may be different for each receiver. If T_charge is a variable, then T_charge may be different for each receiver by virtue of its variability. If T_charge is a constant, then T_charge may be predefined differently for different receivers based on expected usage and need. For one of many examples, T_charge may be short for a receiver with a small capacity battery and long for a receiver with a large capacity battery so that total charging time is substantially similar for both receivers.

The adaptive time share heuristic described by flow diagram 1200 may be used in a system in which all of the receivers include the heuristic. However, even if one or more receivers coupled to the transmitter may not include the heuristic, the heuristic will enable the transmitter to transfer power to more receivers by spreading at least some of the receiver load over time.

Not only are the receivers able to identify when other receivers are receiving power from the transmitter, the transmitter may also use similar methodology to identify when one (or more) receiver is accepting power transfer. When no receivers are accepting power transfer, the transmitter may reduce power generation, turn its power transfer circuitry off, or turn itself off.

The transmitter may monitor the voltage of the power transfer coil to detect the presence of active receivers. When a receiver begins charging, the voltage on the power transfer coil decreases as the receiver load causes a decrease in the effective Q-factor of the transmitter resonant circuit. When a receiver stops charging, the voltage on the power transfer coil increases as the absence of the receiver load causes an increase in the effective Q-factor of the transmitter resonant circuit. By monitoring power transfer coil voltage, the transmitter can thus recognize that receivers are starting and stopping charging.

Additionally, by monitoring the extent of the decrease in power transfer coil voltage at each decrease, it may be possible for the transmitter to identify a number of different receivers active over a certain period by the difference in loading of the receivers.

Further, by monitoring the decrease and increase in power transfer coil voltage, periods of idleness may be detected when no receiver is accepting a transfer of power. The transmitter may track the power transfer coil voltage during each idle phase and use the information gathered over time to determine an average coil voltage, or a range of coil voltages, that represent typical values for idleness. Then, if the coil voltage is significantly lower than the average or the range during an idle phase, the transmitter may determine that a metal object has been placed in proximity to the power transfer coil, and the transmitter may react accordingly. Alternatively, the transmitter may compare the coil voltage at any time during idle to a predefined threshold, instead of determining a typical value for idleness.

Thus, a transmitter may use the change of power transfer coil voltage to identify periods of idleness, and further to identify the presence of metal objects absorbing power.

CONCLUSION

In a wireless power transfer system with multiple receivers, wherein the loading from the receivers causes the magnetic field generated on a power transfer coil of a transmitter resonant circuit to decrease, receiver management may be necessary to effectively provide power to the multiple receivers.

In one implementation, receiver management includes the use of different resonant frequencies for different receivers, and sweeping or stepping the transmitter resonant and/or operating frequency to the resonant frequency of different receivers in turn.

In another implementation, receiver management includes receiver self-management, in which the receiver load current duty cycle is controlled to maintain receiver voltage even in the presence of multiple receivers.

In another implementation, receiver management includes receiver self-management, in which one or more receivers use a time-sharing heuristic to identify when other receivers are charging and wait to begin receiving a transfer of power until another receiver has stopped receiving a transfer of power.

A transmitter may identify when receivers start and stop receiving a transfer of power, to shut down parts or all of the transmitter during periods of idleness, to identify a number of receivers coupled to the transmitter, and to identify when metal objects are in proximity to the transmitter and absorbing power from the power transfer coil.

With regard to the heuristics described herein, it should be understood that, although the sequence of such heuristics have been described as occurring according to a certain order, such heuristic could be practiced with the sequence in an order other than the order described herein. It further should be understood that certain parts of the sequence could be performed substantially in parallel, that other parts could be added to the sequence, or that certain parts of the sequence described herein could be omitted. In other words, the descriptions of heuristics herein are provided for the purpose of illustration, and should in no way be construed so as to limit the claimed invention.

Accordingly, it is to be understood that the above description is intended to be illustrative and not restrictive. Many embodiments and applications other than the examples provided would be apparent upon reading the above description. The scope of the invention should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the invention is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A method suitable for wireless power transfer from a transmitter including a resonant circuit with a power transfer coil through magnetic coupling to multiple receivers each including a power transfer coil, the method useable in a first receiver configured to receive a transfer of energy wirelessly from the transmitter unit, comprising:
   the first receiver configured to receive a transfer of energy wirelessly from a source based on an adaptive time share heuristic, including
   initializing an energy transfer detection period with a predefined duration;
   reinitializing the energy transfer detection period if the first receiver determines that another receiver is starting to receive a transfer of energy from the transmitter based on a decrease in coil voltage of the receiver power transfer coil;
   determining an end of the energy transfer detection period if either:
      the predefined duration ends, and the first receiver does not determine that another receiver starts receiving a transfer of energy from the transmitter based on a decrease in coil voltage of the receiver power transfer coil, or
      if the first receiver determines that another receiver stops receiving a transfer of energy from the transmitter based on an increase in coil voltage of the receiver power transfer coil; and
   at the end of the energy transfer detection period, initiating a wait period with a random or pseudo-random duration; and
   at the end of the wait period, if the first receiver determines that, during the wait period, no other receiver started to receive a transfer of energy from the transmitter, the first receiver starting to receive a transfer of energy from the transmitter.

2. The method of claim 1, further comprising:
   the first receiver stopping the receiving of a transfer of energy from the transmitter at the end of a predefined charge period.

3. The method of claim 2, wherein the transmitter is configured to detect when the first receiver starts and stops receiving a transfer of energy.

4. The method of claim 3, wherein the transmitter is configured to detect when the first receiver starts or stops receiving a transfer of energy by detecting a decrease or increase, respectively, of the coil voltage on the transmitter power transfer coil.

5. The method of claim 3, wherein the transmitter is configured to turn off at least a part circuitry in the transmitter based on either determining that an average idle voltage crosses an idle voltage threshold, or determining that at least one limit of an idle voltage range crosses an idle threshold.

6. The method of claim 3, wherein the transmitter is configured to determine if a metal object is in proximity to the transmitter based on either determining that an average idle voltage crosses an idle voltage threshold, or determining that at least one limit of an idle voltage range crosses an idle threshold the transmitter determining, if the average idle voltage crosses an excess threshold, that a metal object is in proximity to the transmitter.

7. A transmitter circuit suitable for wireless power transfer to multiple receiver circuits, each configured to receive power transfer wirelessly from the transmitter circuit, the transmitter circuit comprising:

an alternating current (AC) power supply, and
a resonant circuit including a power transfer coil, and configured to receive power from the AC power supply;
the transmitter circuit configured to generate a magnetic field from the power transfer coil for transmitting power through magnetic coupling to the multiple receiver circuits;
each receiver circuit including a power transfer coil, and configured to receive power transfer based on an adaptive time share heuristic including:
initializing a power transfer detection period with a predefined duration;
reinitializing the power transfer detection period if the receiver circuit determines that another receiver circuit is receiving power transfer from the transmitter circuit based on a decrease in coil voltage of the receiver power transfer coil;
determining an end of the power transfer detection period if either:
the predefined duration ends, and the receiver circuit does not determine that another receiver circuit is receiving power transfer based on a decrease in coil voltage of the receiver power transfer coil, or
the receiver circuit determines that another receiver circuit stops receiving power transfer based on an increase in coil voltage of the receiver power transfer coil;
at the end of the power transfer detection period, initiating a wait period with a random or pseudo-random duration; and
at the end of the wait period, if the receiver circuit does not determine that another receiver circuit is receiving power transfer from the transmitter circuit based on a decrease in coil voltage of the receiver power transfer coil, initiating power transfer to the receiver circuit based on magnetic coupling from the transmitter power transfer coil through the receiver power transfer coil.

8. The transmitter circuit of claim 7, wherein the receiver circuit terminates power transfer from the transmitter circuit after a predefined charge period.

9. The transmitter circuit of claim 8,
the transmitter circuit further configured to detect when the receiver initiates and terminates power transfer.

10. The transmitter circuit of claim 9,
the transmitter circuit is further configured to detect when the receiver circuit initiates or terminates power transfer by detecting a decrease or increase, respectively, of the coil voltage on the transmitter power transfer coil.

11. The transmitter circuit of claim 9,
the transmitter circuit further configured to turn off at least a part circuitry in the transmitter based on either determining that an average idle voltage crosses an idle voltage threshold, or determining that at least one limit of an idle voltage range crosses an idle threshold.

12. The transmitter circuit of claim 9,
the transmitter further configured to determine if a metal object is in proximity to the transmitter based on either determining that an average idle voltage crosses an idle voltage threshold, or determining that at least one limit of an idle voltage range crosses an idle threshold.

13. A receiver circuit suitable for use in a wireless power transfer system including a transmitter circuit and multiple receiver circuits, the transmitter circuit including a resonant circuit with a power transfer coil and configured to generate a magnetic field for transmitting power through magnetic coupling, the receiver circuit comprising:
a power transfer coil; and
power transfer circuitry configured to receive power transfer through the power transfer coil based on an adaptive time share heuristic;
the adaptive time share heuristic including:
initializing a power transfer detection period with a predefined duration;
reinitializing the power transfer detection period if the receiver circuit determines that another receiver circuit is receiving power transfer from the transmitter circuit based on a decrease in coil voltage of the receiver power transfer coil;
determining an end of the power transfer detection period if either:
the predefined duration ends, and the receiver circuit does not determine that another receiver circuit is receiving power transfer based on a decrease in coil voltage of the receiver power transfer coil, or
the receiver circuit determines that another receiver circuit stops receiving power transfer based on an increase in coil voltage of the receiver power transfer coil;
at the end of the power transfer detection period, initiating a wait period with a random or pseudo-random duration; and
at the end of the wait period, if the receiver circuit does not determine that another receiver circuit is receiving power transfer from the transmitter circuit based on a decrease in coil voltage of the receiver power transfer coil, initiating power transfer to the receiver circuit based on magnetic coupling from the transmitter power transfer coil through the receiver power transfer coil.

14. The receiver circuit of claim 13,
the receiver circuit is configured to terminate power transfer from the transmitter circuit after a predefined charge period.

15. The receiver circuit of claim 14, wherein the transmitter circuit is configured to detect when the receiver initiates and terminates power transfer.

16. The receiver circuit of claim 15, wherein the transmitter circuit is further configured to detect when the receiver circuit initiates or terminates power transfer by detecting a decrease or increase, respectively, of the coil voltage on the transmitter power transfer coil.

17. The receiver circuit of claim 15, wherein the transmitter circuit is further configured to turn off at least a part circuitry in the transmitter based on either determining that an average idle voltage crosses an idle voltage threshold, or determining that at least one limit of an idle voltage range crosses an idle threshold.

18. The receiver circuit of claim 15, wherein the transmitter circuit is further configured to determine if a metal object is in proximity to the transmitter based on either determining that an average idle voltage crosses an idle voltage threshold, or determining that at least one limit of an idle voltage range crosses an idle threshold.

* * * * *